(12) United States Patent
Liang

(10) Patent No.: US 10,339,802 B2
(45) Date of Patent: Jul. 2, 2019

(54) METHOD AND SYSTEM FOR MANAGING A PARKING LOT

(71) Applicant: Wistron Corp., New Taipei (TW)

(72) Inventor: Chen-Yi Liang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 15/863,838

(22) Filed: Jan. 5, 2018

(65) Prior Publication Data

US 2019/0080595 A1 Mar. 14, 2019

(30) Foreign Application Priority Data

Sep. 13, 2017 (TW) .............................. 106131399 A

(51) Int. Cl.
*G08G 1/01* (2006.01)
*G08G 1/065* (2006.01)
*G07B 15/04* (2006.01)
*G08G 1/017* (2006.01)
*B60R 25/10* (2013.01)
*B60R 25/30* (2013.01)

(52) U.S. Cl.
CPC ......... *G08G 1/065* (2013.01); *B60R 25/1012* (2013.01); *B60R 25/30* (2013.01); *B60R 25/305* (2013.01); *G07B 15/04* (2013.01); *G08G 1/01* (2013.01); *G08G 1/017* (2013.01); *G08G 1/0175* (2013.01)

(58) Field of Classification Search
CPC ........ G08G 1/01; G08G 1/017; G08G 1/0175; G08G 1/065; G07B 15/00; G07B 15/02; G07B 15/04; B60R 25/1012; B60R 25/30; B60R 25/305
See application file for complete search history.

(56) References Cited

U.S. PATENT DOCUMENTS

| | | | | |
|---|---|---|---|---|
| 2006/0232442 | A1* | 10/2006 | Vastad | G07B 15/04 340/932.2 |
| 2007/0069921 | A1* | 3/2007 | Sefton | G08G 1/0175 340/932.2 |
| 2013/0117078 | A1 | 5/2013 | Weik, III et al. | |
| 2017/0073912 | A1* | 3/2017 | Marabyan | E01F 13/06 |

FOREIGN PATENT DOCUMENTS

| | | |
|---|---|---|
| TW | M456561 U1 | 7/2013 |
| TW | M464511 U | 11/2013 |

* cited by examiner

*Primary Examiner* — Andrew W Bee

(57) ABSTRACT

A method for managing a parking lot is provided. The method includes: capturing, by a first video camera, an image of a vehicle; determining whether the image satisfies a condition; raising a first barrier when the image satisfies the condition; detecting whether there is only the one vehicle between the first barrier and a second barrier; and raising the second barrier to enable the vehicle to enter or leave the parking lot when detecting that there is only the one vehicle between the first barrier and the second barrier.

24 Claims, 18 Drawing Sheets

METHOD AND SYSTEM FOR MANAGING A PARKING LOT

CROSS REFERENCE TO RELATED APPLICATIONS

This application claims priority of Taiwan Patent Application No. 106131399, filed on Sep. 13, 2017, the disclosure of which is incorporated herein by reference in their entirety.

BACKGROUND OF THE INVENTION

Field of the Invention

Aspects of the present disclosure relate generally to a parking lot, and more particularly, to a method and a system for managing a parking lot.

Description of the Related Art

To park a car is often a nightmare for people who live in cities because of the lack of parking spaces. Therefore, commercial parking lots have been developed to solve this problem. However, if a parking lot does not have a secure management system, cars may be still stolen or drivers may still risk of being attacked.

Therefore, there is a need for a method and a system for managing a parking lot to solve these problems.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a system for managing a parking lot are provided in the disclosure.

In a preferred embodiment, the disclosure is directed to a method for managing a parking lot, comprising: capturing, by a first video camera, an image of a vehicle; determining whether the image satisfies a condition; raising a first barrier when the image satisfies the condition; detecting whether there is only the one vehicle between the first barrier and a second barrier; and raising the second barrier to enable the vehicle to enter or leave the parking lot when detecting that there is only the one vehicle between the first barrier and the second barrier.

In some embodiments, the image is an entrance image of the vehicle entering the parking lot, the step of determining whether the image satisfies the condition further comprises: determining whether vehicle information of the vehicle in the entrance image matches information stored in a database; and raising the first barrier when the vehicle information matches the information stored in the database.

In some embodiments, the method further comprises: detecting whether the vehicle enters within a first distance from a parking space; raising a parking-space barrier corresponding to the parking space when detecting that the vehicle enters within the first distance from the parking space; detecting whether a wheel blocking structure corresponding to the parking space is triggered to limit the vehicle in the parking space; detecting whether a person has left the parking space when the wheel blocking structure corresponding to the parking space is triggered; and lowering the parking-space barrier when detecting that the person has left the parking space.

In some embodiments, the parking-space barrier is mounted in a position in front of a driver's seat corresponding to the vehicle.

In some embodiments, before detecting whether the vehicle enters within the first distance from the parking space, the method further comprises: determining whether there is a fixed parking space in the database corresponding to the license number of the vehicle; transmitting a first indication signal to indicate the fixed parking space when the fixed parking space corresponding to the license number is stored in the database; and selecting a first parking space as the parking space and transmitting the first indication signal to indicate the parking space when there is no fixed parking space corresponding to the license number in the database, wherein the first parking space is selected from among the parking spaces in which the vehicle has previously parked in a history record corresponding to the vehicle in the database.

In some embodiments, after lowering the parking-space barrier, the method further comprises: detecting whether the person enters within a second distance from a personnel access door; opening the personnel access door when detecting that the person enters within the second distance from the personnel access door; and closing the personnel access door when detecting that the person has left the parking lot.

In some embodiments, the image is an exit image of the vehicle approaching the first barrier, the step of determining whether the image satisfies the condition further comprises: detecting whether the vehicle enters within a third distance from the first barrier; and raising the first barrier when detecting that the vehicle enters within the third distance from the first barrier.

In some embodiments, before capturing the image of the vehicle, the method further comprises: capturing, by a second camera, a second entrance image from the personnel access door, wherein the second image comprises the person; determining whether the face of the person matches the facial image of the person in the database; opening the personnel access door when the face of the person matches the facial image of the person in the database; transmitting a second indication signal to indicate the parking space corresponding to the person; detecting whether the person enters within the first distance from the parking space; raising the parking-space barrier corresponding to the parking space when detecting that the person enters within the first distance from the parking space; detecting whether the person has entered the vehicle; and restoring a wheel blocking structure when detecting that the person has entered the vehicle.

In some embodiments, after detecting that the person has entered the vehicle, the method further comprises: lowering the parking-space barrier and detecting whether there is any other person in the parking space; and locking the wheel blocking structure and transmitting a notification signal to an administrator when detecting that there is other person in the parking space.

In some embodiments, after opening the personnel access door, the method further comprises: detecting whether the person passes through the personnel access door; and closing the personnel access door when detecting that the person has passed through the personnel access door.

In some embodiments, after restoring the wheel blocking structure, the method further comprises: detecting whether the vehicle has left the parking space; and lowering the parking-space barrier and transmitting a third indication signal to indicate the first barrier when detecting that the vehicle has left the parking space.

In some embodiments, after raising the first barrier, the method further comprises: detecting whether the vehicle has passed through the first barrier; and lowering the first barrier when detecting that the vehicle has passed through the first barrier In some embodiments, after raising the first barrier, the method further comprises: detecting whether the vehicle has passed through the second barrier; and lowering the second barrier when detecting that the vehicle has passed through the second barrier.

In some embodiments, a distance between the first barrier and the second barrier is within a range.

In a preferred embodiment, the disclosure is directed to a system for managing a parking lot. The system comprises a parking lot and a management server. The parking lot is provided with a first barrier and a second barrier. The management server is coupled to the first barrier and the second barrier, and comprises a control circuit, a processor and a memory. The processor is installed in the control circuit. The memory is installed in the control circuit and operatively coupled to the processor. The processor is configured to execute a program code stored in the memory to perform operations comprising: capturing an image of a vehicle with a first video camera; determining whether the image satisfies a condition; raising a first barrier when the image satisfies the condition; detecting whether there is only the one vehicle between the first barrier and a second barrier; and raising the second barrier to enable the vehicle to enter or leave the parking lot when detecting that there is only the one vehicle between the first barrier and the second barrier.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
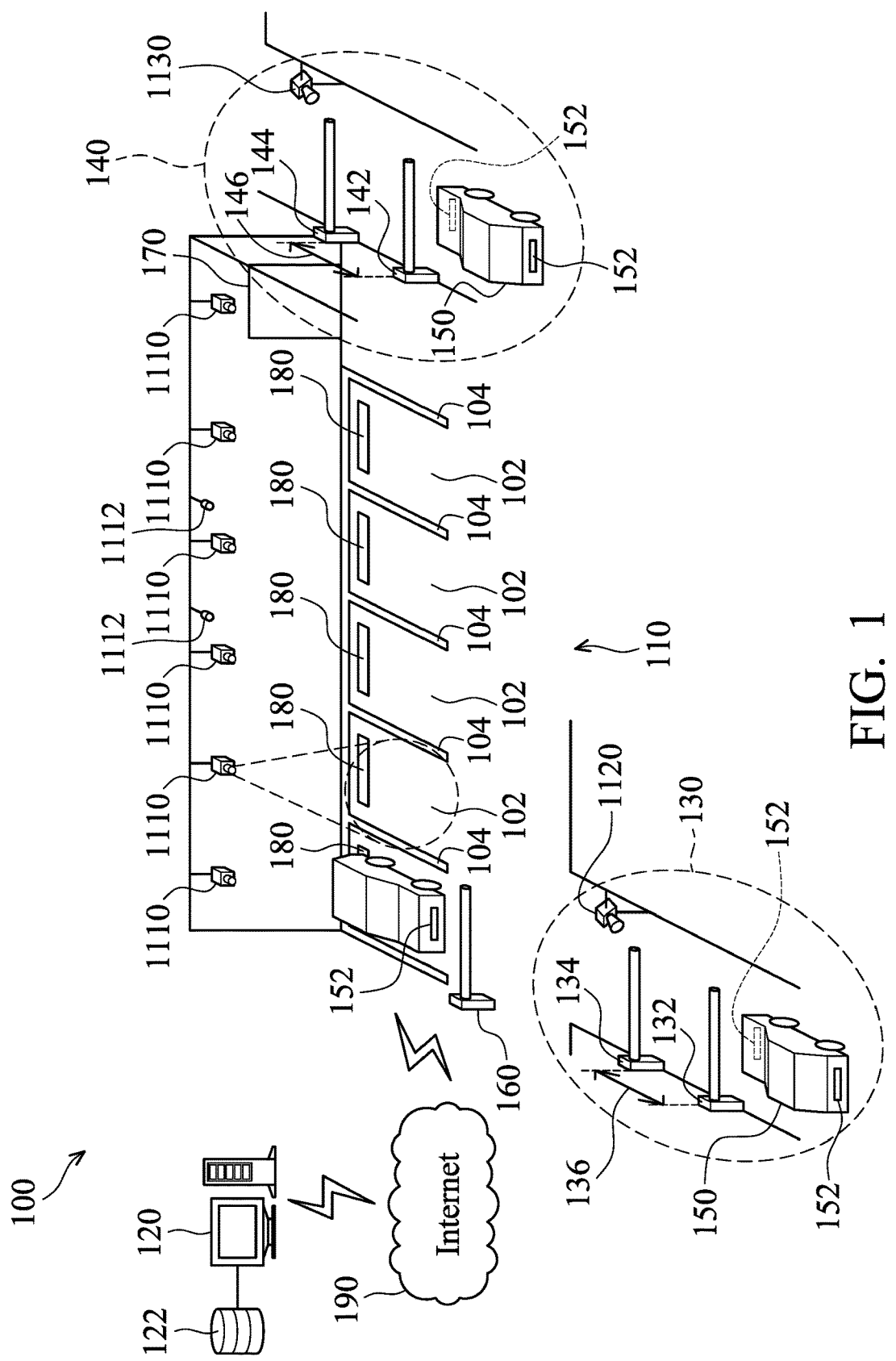
FIG. 1 shows a perspective view of a system for managing a parking lot according to one embodiment of the present disclosure.

FIG. 1 shows a perspective view of a system 100 for managing a parking lot according to one embodiment of the present disclosure. The system 100 may comprise a parking lot 110 and a management server 120. The management server 120 may be connected to all the devices in the parking lot 110 via the network 190, wherein the network 190 may be any type of network familiar to those skilled in the art that can support data communications using any of a variety of commercially-available protocols, including without limitation TCP/IP and so on. Merely by way of example, the network 190 may be a local area network (LAN), such as an Ethernet network and/or the like; a virtual network, including without limitation a virtual private network (VPN); the Internet; a wireless network; and/or any combination of these and/or other networks.

Each video camera 1110 can be mounted on parking lot lights 1112 or mounted on an outside wall of the parking lot 110 (not shown in FIG. 1), such as a wall, column, and/or beam, and/or other structures. In one or more alternative embodiments, the video camera 1110 can be mounted to a permanent and/or stationary object and/or structure, or to a moving object, such as a vehicle.

Well-known video camera 1110 can include, be connected to, be coupled to, and/or provide a video signal to the management server 120. The management server 120 can control various parameters of the video camera 1110. The video camera 1110 can be stationary or movable. For example, the video camera can translate, swivel, and/or tilt. Moreover, the video camera 1110 can be aimed at a fixed location or can pan across a range of locations. Furthermore, the video camera 1110 can zoom in and out.

The video camera 1110 can be configured to perceive and/or output polarized or unpolarized light. Moreover, the video camera 1110 can be configured to perceive and/or output light of any spectrum, including infrared, visible, and ultraviolet light. The video data output by the video camera 1110 can be in black and white and/or color. Moreover, video data can be output at any frame speed, such as for example, thirty frames per second.

The video camera 1110 can output analog and/or digital video data in a signal sent to the management server 120. The management server 120 can process the output of the video camera 1110, and can be used, for example, to filter, transform, enhance, recognize, compress, and/or encrypt the video data output. The management server 120 can process continuously, at selected times, at selected locations, and/or as commanded. Commands can be input to the video camera 1110 and/or the management server 120. The commands can include, for example, "swivel 20 degrees left", "zoom in 30%", etc.

The parking lot 100 can include a plurality of parking spaces 102. A first entrance barrier 132 and a second entrance barrier 134 can be installed at an entrance 130, wherein the distance 136 between the first entrance barrier 132 and the second entrance barrier 134 is within a first range. For example, the first range is between 1 to 1.5 times the length of the vehicle. The purpose of providing the second entrance barrier 134 is to prevent a second vehicle from entering the parking lot by following the first vehicle through.

The individual parking spaces 102 are respectively partitioned or separated from one another by surface markings 104. For example, the surface markings 104 may be applied on the ground with paint or projected on the ground in the form of light markings by light emitting diode (LED) lights. The video camera 1110 may be used to detect whether a vehicle 150 enters within a distance from the parking space 102 (i.e., whether the vehicle 150 is close to a parking space) or to check correct parking positions or parking states of the vehicles 150.

Each of the vehicles 150 that use the parking lot 110 has one or more license plates 152, wherein a license number is printed on each license plate 152. In addition, the video camera 1120 installed at the entrance 130 may be connected to the management server 120, may capture entrance images that the vehicle 150 enters into the parking lot 110 and may transmit the license number of the vehicle 150 to the management server 120.

A first exit barrier 142 and a second exit barrier 144 are installed at an exit 140 (indicated by dotted lines), wherein the distance between the first exit barrier 142 and the second exit barrier 144 is within a second range. For example, the second range is between 1 and 1.5 times the length of the vehicle. The purpose of providing the second exit barrier 144 is to prevent a second vehicle from leaving the parking lot by following the first vehicle through. In addition, the video camera 1130 installed at the exit 140 may be connected to the management server 120, may capture exit images of the vehicle 150 leaving the parking lot 110 and may transmit the license number of the vehicle 150 to the management server 120.

A parking-space barrier 160 may be installed at each parking space. The parking-space barrier 160 may be mounted at the entrance of the parking space 102 (as shown in FIG. 1). In one embodiment, the parking-space barrier 160 may be mounted in a position in front of a driver's seat corresponding to the vehicle (not shown), which is used to prevent the door of the driver's seat from being opened by other than a driver. In an embodiment, the parking-space barrier 160 may also be mounted in front of each door of the vehicle (not shown) to prevent the door from being opened.

The parking lot 110 may further be provided with a personnel access door 170 for a person to enter and exit the parking lot 110. The first entrance barrier 132, the second entrance barrier 134, the first exit barrier 142, the second exit barrier 144, and the parking-space barrier 160 may all be connected to the management server 120 and controlled by the management server 120.

The management server 120 may have a database 122, which may be used to store license numbers of vehicles, facial images of drivers and/or passengers, fixed parking spaces of vehicles or parking history records of vehicles and so on inputted by the administrator in advance. For example, a fixed parking space of a vehicle may be previously entered into the database 122 by the administrator.

The parking lot lights 1112 may also mounted on the ground in the parking lot (not shown), and are connected to the management server 120. The management server 120 can transmit an indication signal to control the parking lot lights 1112 to emit light in different colors so that the driver can find the parking space according to the parking lot lights 1112.

Each parking space may have a wheel blocking structure 180 used to prevent the vehicle from moving and limit the vehicle in the parking space. The wheel blocking structure 180 may be connected to the management server 120 and controlled by the management server 120. The details of the wheel blocking structure 180 will be described later.

In addition, the driver can also download and install a dedicated parking lot application (for convenience of understanding, the dedicated parking lot application is also referred to as parking lot APP) developed by the management server 120 through a terminal device (not shown). The management server 120 may transmit the indication signal to the terminal device to indicate the driver to find information such as a parking space, an entrance or an exit. The terminal device can be a computer or a mobile device, such as a notebook, a smart phone, or a tablet, which can be capable of running an application.

Figure 2:
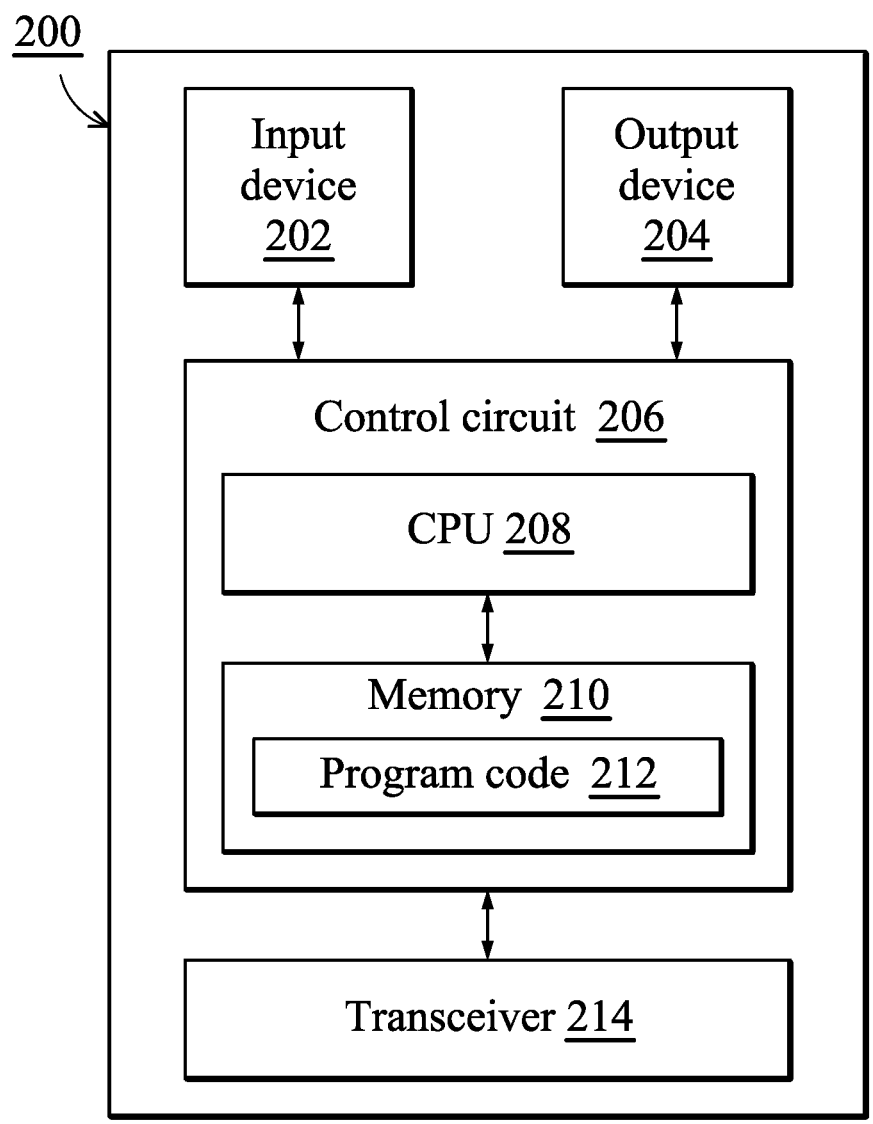
FIG. 2 shows an alternative simplified functional block diagram of an electronic device according to one embodiment of the present disclosure.

Next, turning to FIG. 2, FIG. 2 shows an alternative simplified functional block diagram of an electronic device 200 according to one embodiment of the present disclosure. As shown in FIG. 2, the electronic device 200 can be utilized for realizing the management server 120 or the terminal device used by the driver. The electronic device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the wireless communications device 200. The wireless communications device 200 can receive signals input by a user through the input device 202, such as a keyboard or keypad, and can output images and sound through the output device 304, such as a monitor or speakers. The transceiver 214 is used to receive and transmit wireless signals wirelessly, deliver received signals to the control circuit 206, and output signals generated by the control circuit 206.

Figure 3:
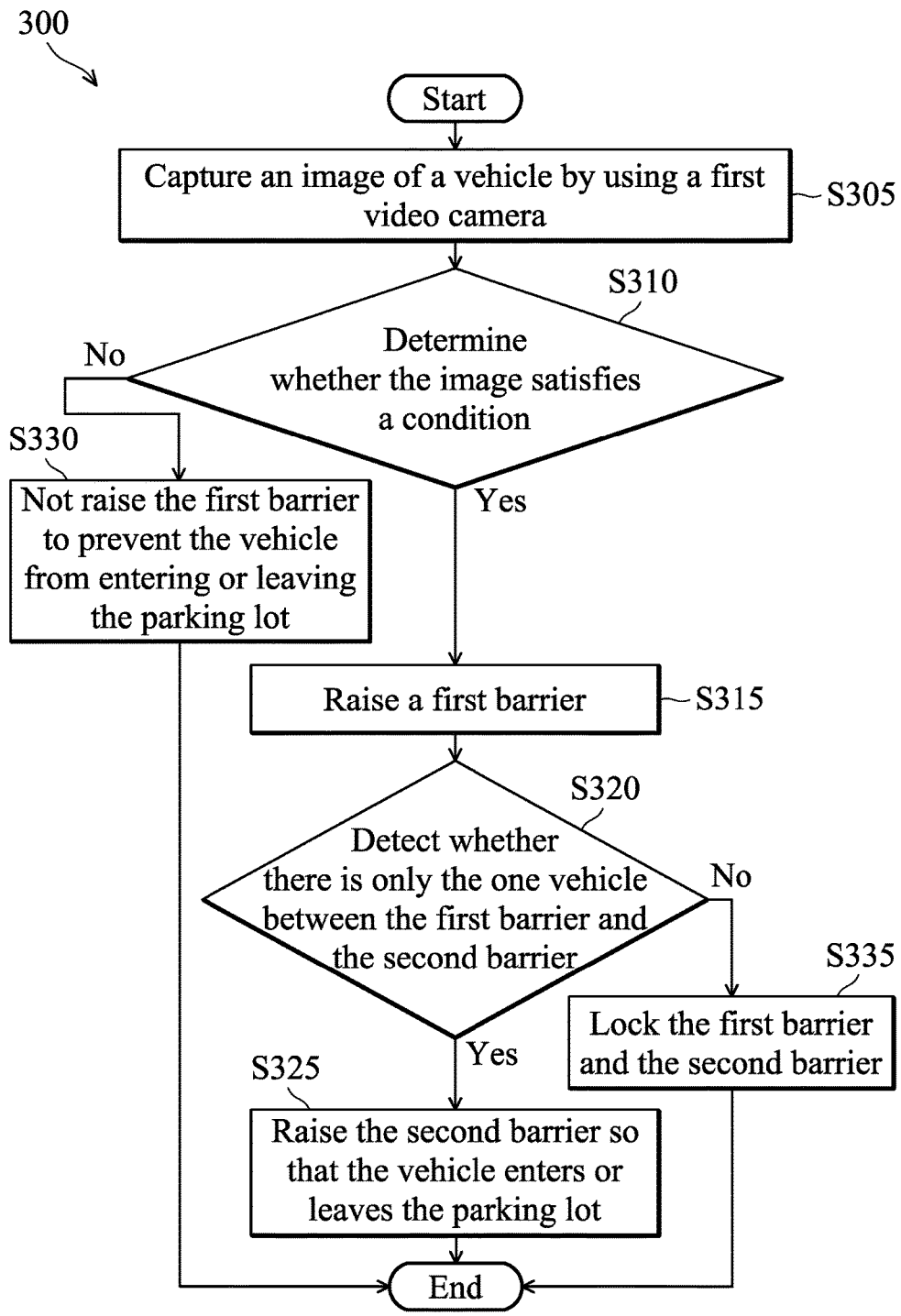
FIG. 3 is a flow diagram illustrating a method for the vehicle entering or leaving a parking lot according to an embodiment of the present disclosure.

FIG. 3 is a flow diagram illustrating a method 300 for the vehicle entering or leaving a parking lot according to an embodiment of the present disclosure, wherein the method 300 may be used in the system 100 in FIG. 1.

In step S305, the system captures an image of a vehicle by using a first video camera. In step S310, the system determines whether the image satisfies a condition. When the system determines that the image satisfies the condition ("Yes" in step S310), in step S315, a first barrier is raised. When the system determines that the image does not satisfy the condition ("No" in step S310), in step S330, the system does not raise the first barrier to prevent the vehicle from entering or leaving the parking lot.

The image in step S305 may be an entrance image of the vehicle entering the parking lots, or an exit image of the vehicle approaching the first barrier. When the image is the entrance image of the vehicle entering the parking lot, the condition is whether vehicle information of the vehicle in the entrance image matches information stored in a database. When the vehicle information matches the information stored in the database, the system raises the first barrier. When the image is the exit image of the vehicle approaching the first barrier, the condition is whether the vehicle in the image enters within a third distance from the first barrier. When the vehicle enters within the third distance from the first barrier, the first barrier is raised.

Next, in step S320, the system detects whether there is only the one vehicle between the first barrier and the second barrier. In an embodiment, the distance between the first barrier and the second barrier is within a range. When there is only the one vehicle between the first barrier and the second barrier ("Yes" in step S320), in step S325, the second barrier is raised so that the vehicle enters or leaves the parking lot. When there is another vehicle other than the vehicle between the first barrier and the second barrier ("No" in step S320), in step S335, the system locks the first barrier and the second barrier, and the management server transmits a notification message to notify an administrator to deal with the situation. In an embodiment, the locked first barrier and locked second barrier can only be manually unlocked by the administrator to increase safety.

In an embodiment, the system may further detect whether the vehicle has passed through the first barrier after raising the first barrier in step S315. When the system detects that the vehicle has passed through the first barrier, the system lowers the first barrier. In another embodiment, the system further detects whether the vehicle has passed through the second barrier after the system raises the second barrier in step S325. The system lowers the second barrier when detecting that the vehicle has passed through the second barrier.

Figure 4A:
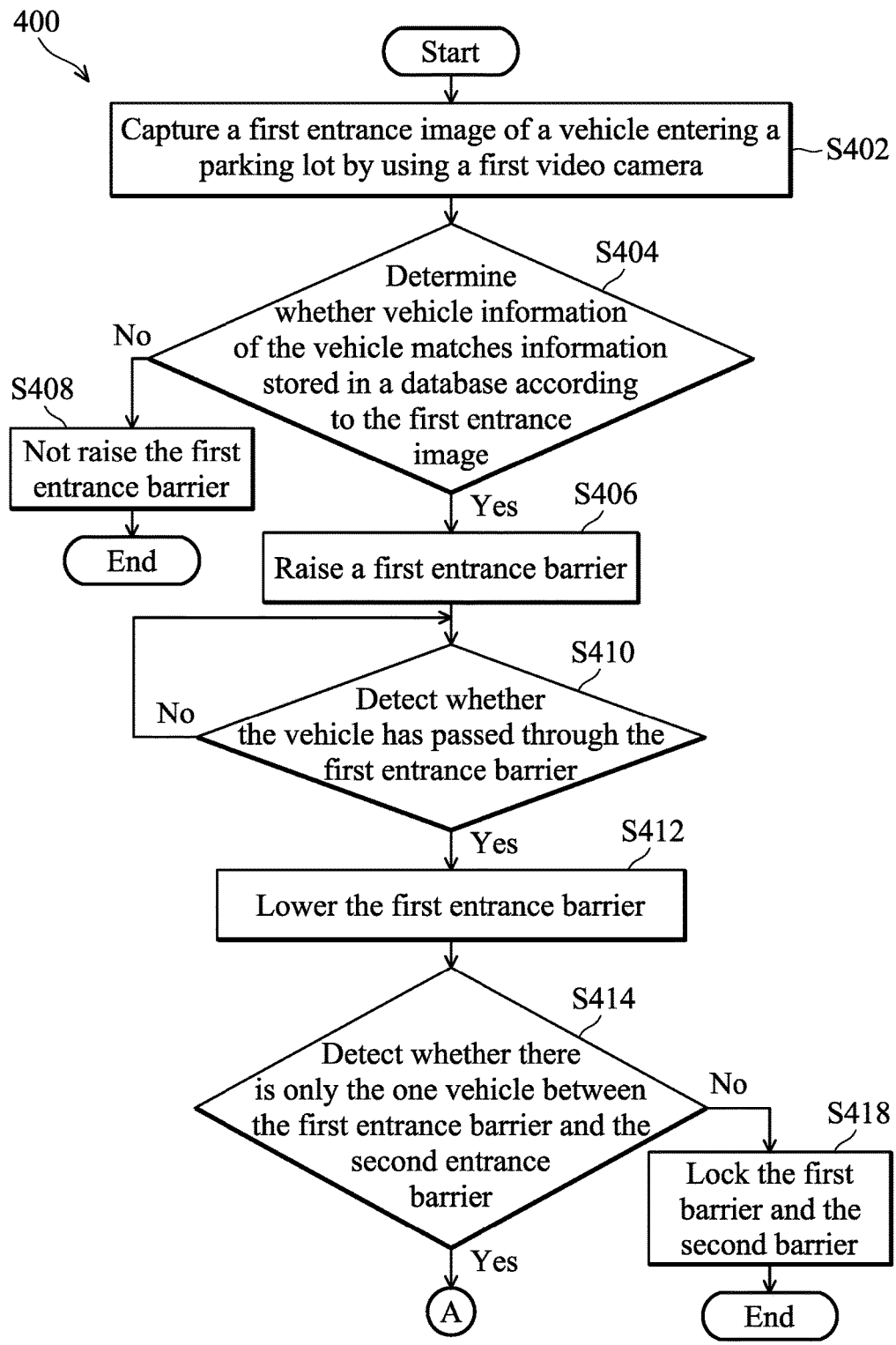
FIGS. 4A~4C are flow diagrams illustrating a method for the vehicle entering a parking lot according to another embodiment of the present disclosure.
Figure 4B:
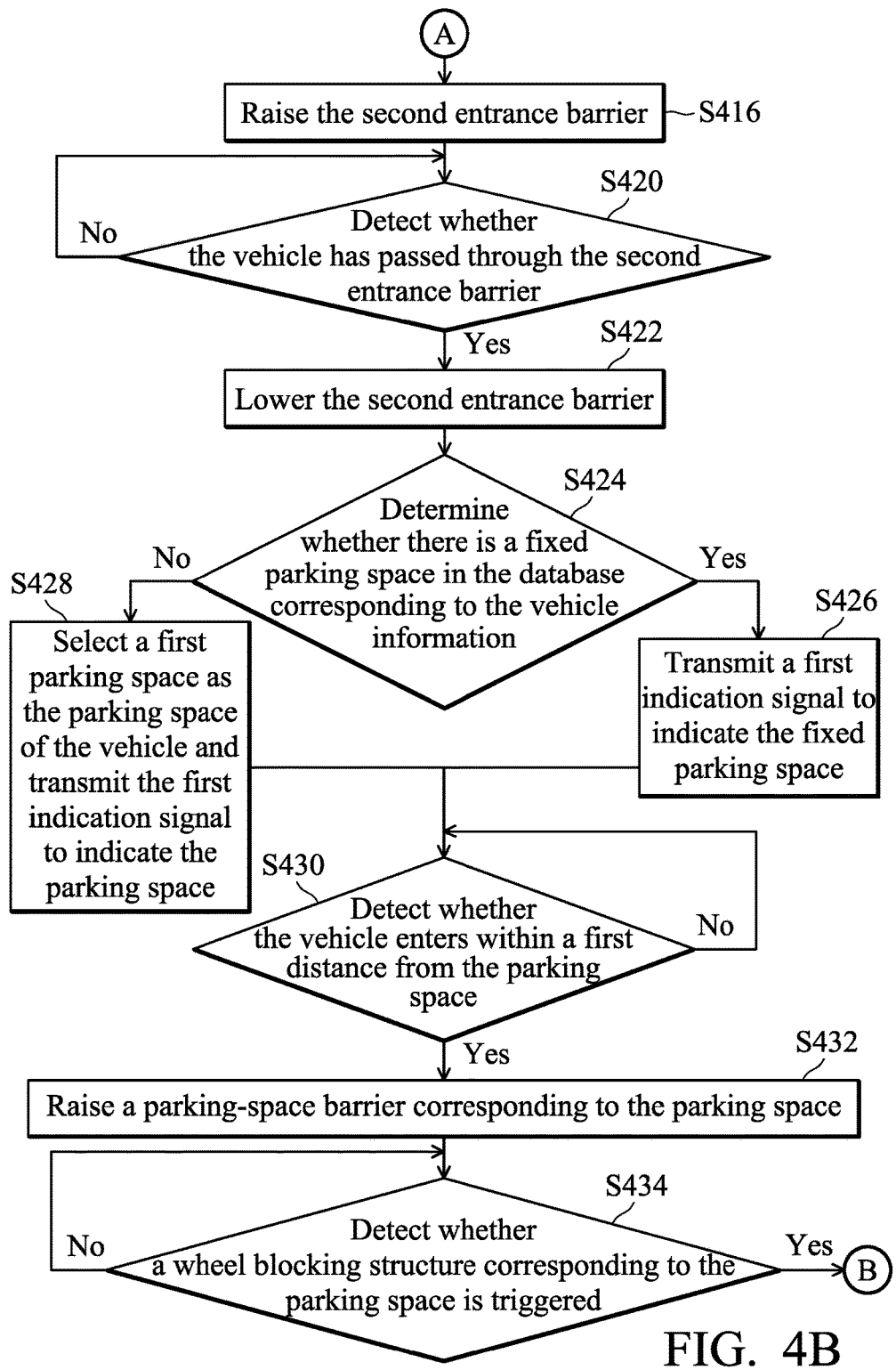
Figure 4C:
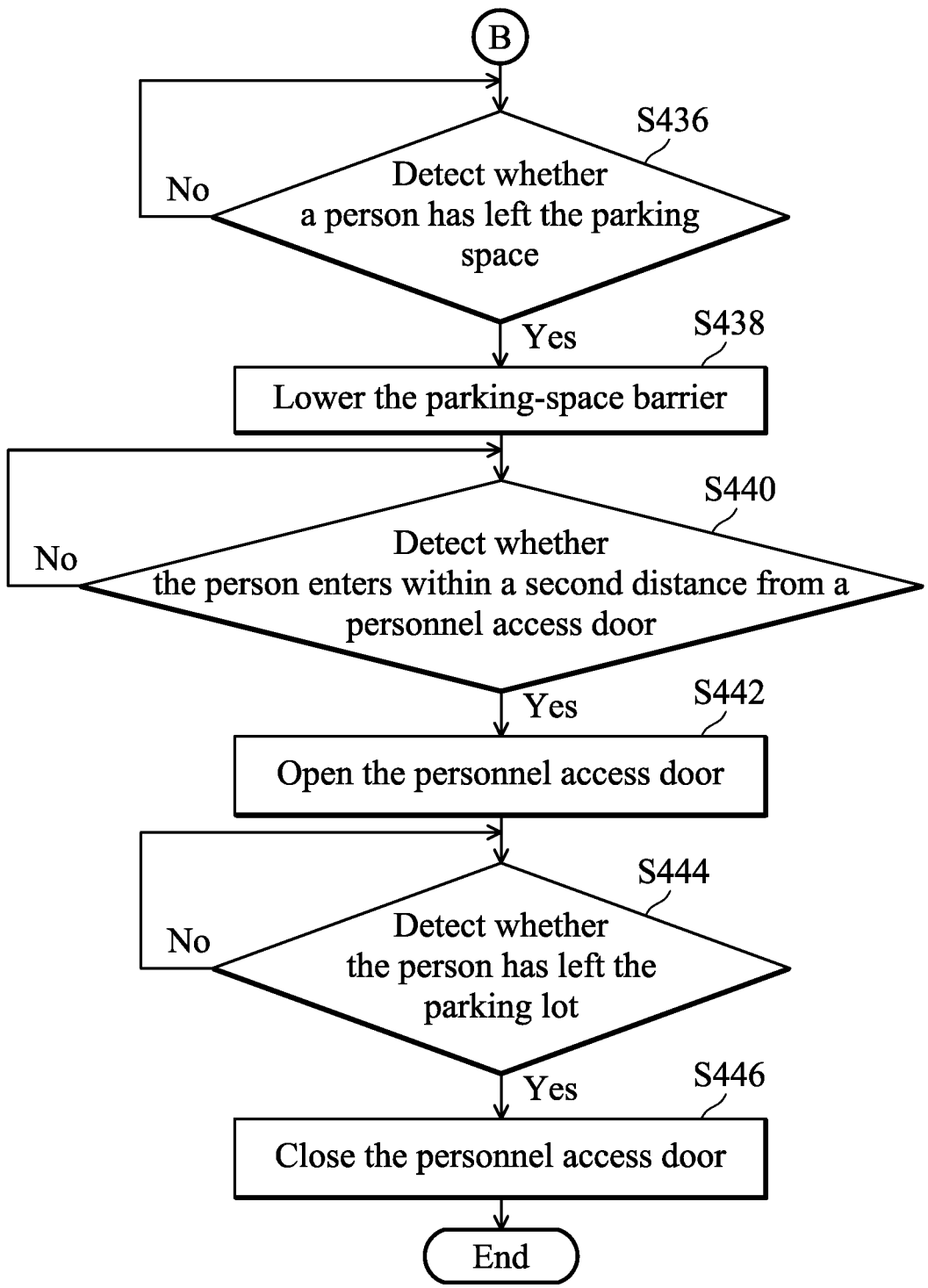

FIGS. 4A~4C are flow diagrams illustrating a method 400 for the vehicle entering a parking lot according to another embodiment of the present disclosure, wherein the method 400 may be used in the system 100 in FIG. 1.

In step S402, the system captures a first entrance image of a vehicle entering a parking lot by using a first video camera. In step S404, the system determines whether vehicle information of the vehicle matches information stored in a database according to the first entrance image, wherein the vehicle information may be a license number. When the system determines that the vehicle information matches the information stored in the database ("Yes" in step S404), in step S406, the system raises a first entrance barrier. When the system determines that the vehicle information does not match the information stored in the database ("No" in step S404), in step S408, the system does not raise the first entrance barrier so that the vehicle cannot enter the parking lot.

Then, in step S410, the system detects whether the vehicle has passed through the first entrance barrier. When the system detects that the vehicle has passed through the first entrance barrier ("Yes" in step S410), the system lowers the first entrance barrier in step S412. When the system detects that the vehicle has not passed through the first entrance barrier ("No" in step S410), the process returns to step S410 and the system continues detecting whether the vehicle has passed through the first entrance barrier.

Next, in step S414, the system detects whether there is only the one vehicle between the first entrance barrier and the second entrance barrier. When the system detects that there is only the one vehicle between the first entrance barrier and the second entrance barrier ("Yes" in step S414), in step S416, the system raises the second entrance barrier. When there is another vehicle other than the vehicle between the first barrier and the second barrier ("No" in step S414), in step S418, the system locks the first barrier and the second barrier, and the management server transmits a notification message to notify an administrator to deal with the situation. In an embodiment, the locked first barrier and locked second barrier can only be manually unlocked by the administrator to increase safety.

Next, in step S420, the system detects whether the vehicle has passed through the second entrance barrier. When the system detects that the vehicle has passed through the second entrance barrier ("Yes" in step S420), in step S422, the system lowers the second entrance barrier. When the system detects that the vehicle has not passed through the second entrance barrier ("No" in step S420), the process returns to step S420 and the system continues detecting whether the vehicle has passed the second entrance barrier.

In step S424, the system may determine whether there is a fixed parking space in the database corresponding to the vehicle information. When the system determines that there is a fixed parking space in the database corresponding to the vehicle information ("Yes" in step S424), in step S426, the system transmits a first indication signal to indicate the fixed parking space. When the system determines that there is no fixed parking space in the database corresponding to the vehicle information ("No" in step S424), in step S428, the system can select a first parking space as the parking space of the vehicle and transmit the first indication signal to indicate the parking space, wherein the first parking space is selected from among the parking spaces in which the vehicle has previously parked in a history record corresponding to the vehicle in the database. In an embodiment, the first parking space selected from the database is a parking space closest to the current position of the vehicle among the parking spaces in a history record corresponding to the vehicle. In another embodiment, the system may also randomly select a first parking space as the parking space of the vehicle. In steps S426 and S428, the system may transmit a first indication signal to the terminal device of the driver to indicate the route and location of the fixed parking space. In another embodiment, the system may also transmit the first indication signal to the parking lot light to control the parking lot light to emit light in different colors so that the driver can find the fixed parking space according to the parking lot light.

Next, in step S430, the system detects whether the vehicle enters within a first distance from the parking space. In other words, the system can detect that the vehicle has approached the parking space using the video camera. When the system detects that the vehicle enters within the first distance from the parking space ("Yes" in step S430), in step S432, the system raises a parking-space barrier corresponding to the parking space so that the vehicle can enter the parking space. When the system detects that the vehicle is not within the first distance from the parking space ("No" in step S430), the process returns to step S430 and the system continues detecting whether the vehicle enters within the first distance from the parking space.

In step S434, the system detects whether a wheel blocking structure corresponding to the parking space is triggered. When the system detects that the wheel blocking structure corresponding to the parking space has been triggered ("Yes" in step S434), in step S436, the system detects whether a person has left the parking space. When the system detects that the person has left the parking space ("Yes" in step S436), in step S438, the system lowers the parking-space barrier.

When the system detects that the wheel blocking structure has not been triggered ("No" in step S434), the process returns to step S434 and the system continues detecting whether the wheel blocking structure is triggered. When the system has not detected that the person leaves the parking space ("No" in step S436), the process returns to step S436 and the system continues detecting whether there is a person leaving the parking space.

Then, in step S440, the system detects whether the person enters within a second distance from a personnel access door. In other words, using the video camera, the system can detect whether the person is close to the personnel access door. When the system detects that the person enters within the second distance from the personnel access door ("Yes" in step S440), in step S442, the system opens the personnel access door to allow the person to leave the parking lot. When the system detects that the person has not entered within the second distance from the personnel access door ("No" in step S440), the process returns to step S440 and the system continues detecting whether the person enters within the second distance from the personnel access door.

In step S444, the system detects whether the person has left the parking lot. When the system detects that the person has left the parking lot ("Yes" in step S444), in step S446, the system closes the personnel access door. When the system detects that the person has not left the parking lot ("No" in step S444), the process returns to step S444 and the system continues detecting whether the person has left the parking lot.

Figure 5A:
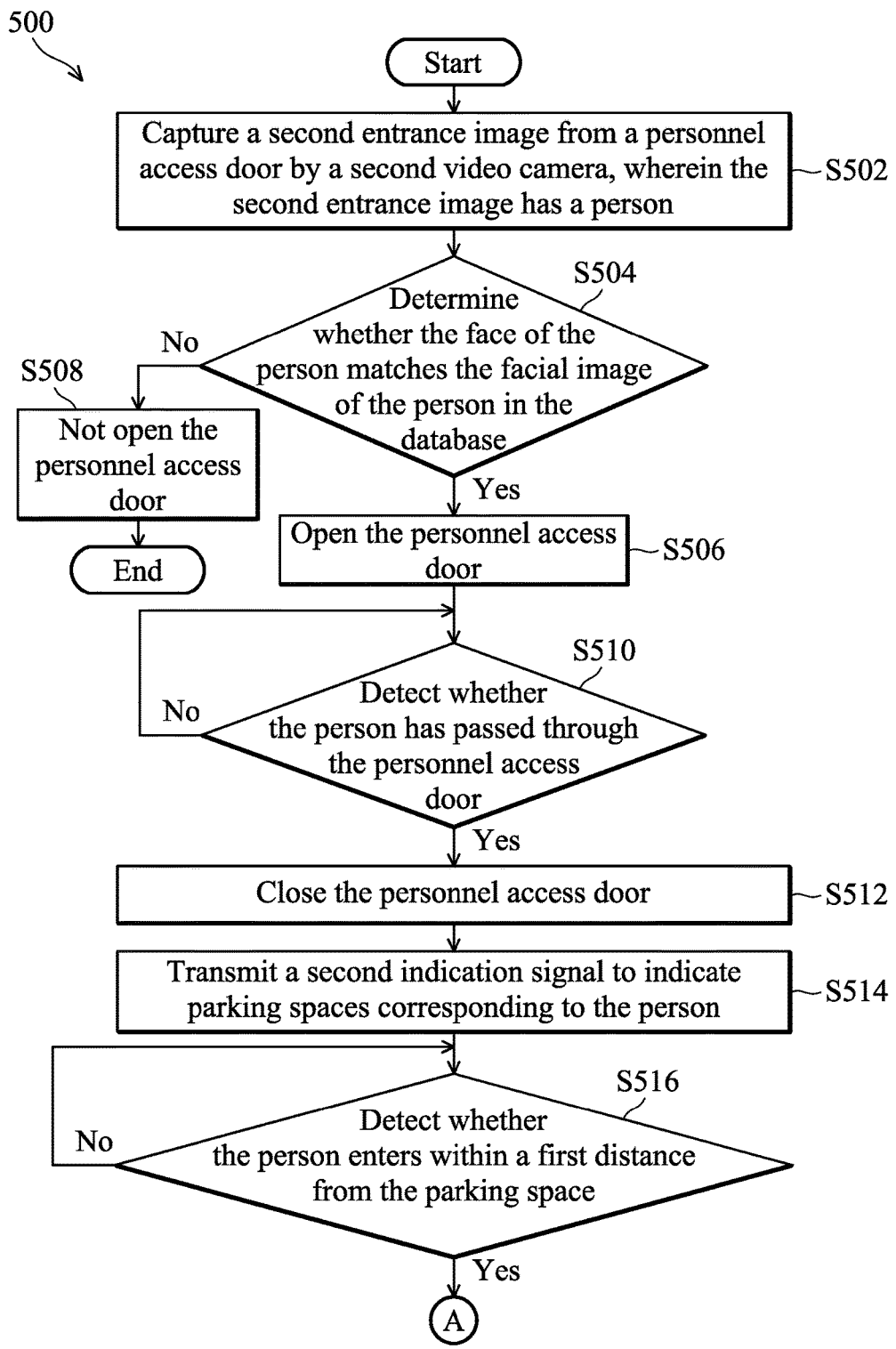
FIGS. 5A~5C are flow diagrams illustrating a method for the vehicle leaving a parking lot according to another embodiment of the present disclosure.
Figure 5B:
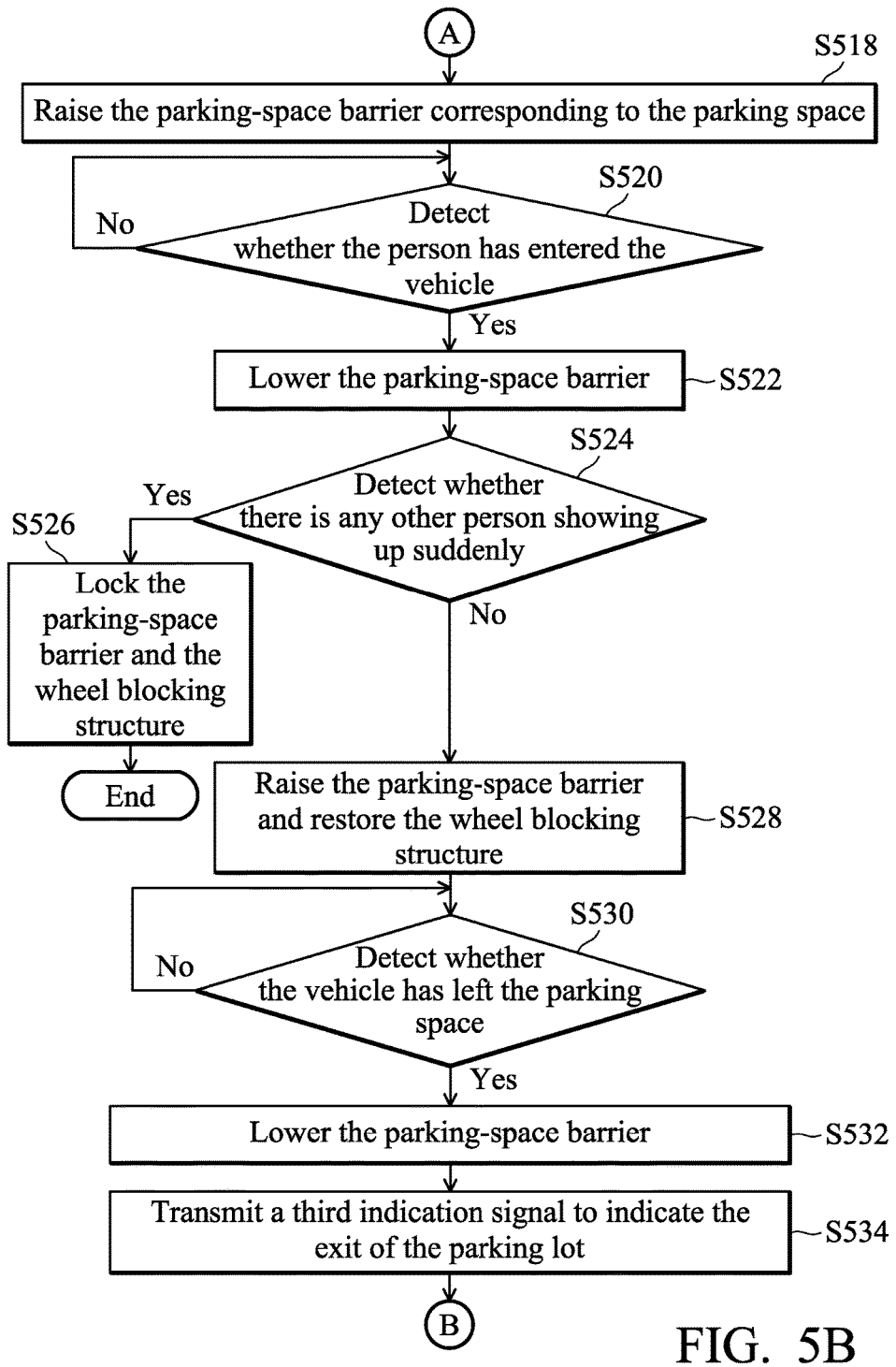
Figure 5C:
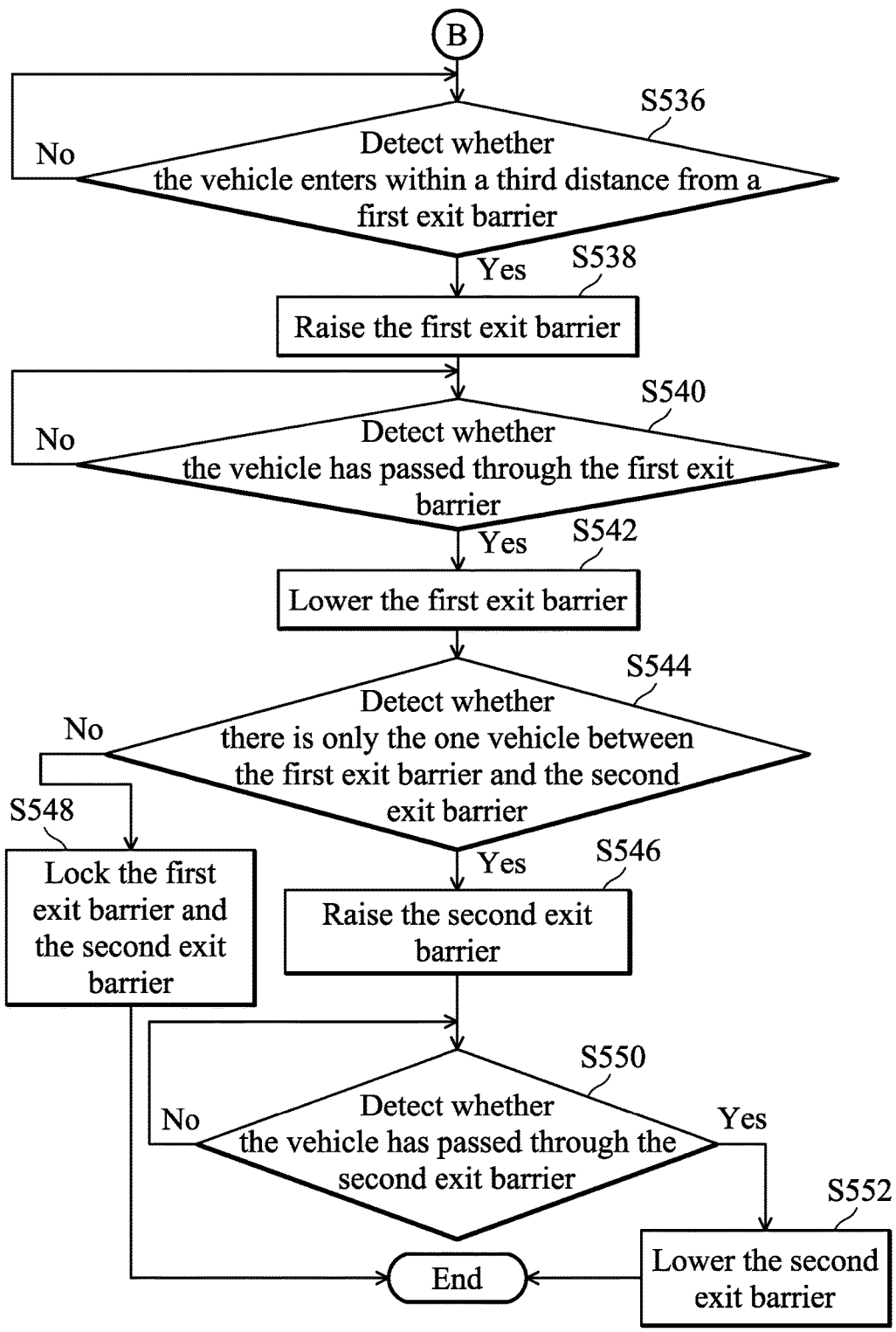

FIGS. 5A~5C are flow diagrams illustrating a method 500 for the vehicle leaving a parking lot according to another embodiment of the present disclosure, wherein the method 500 may be used in the system 100 in FIG. 1.

In step S502, the system captures a second entrance image from a personnel access door by a second video camera, wherein the second entrance image has a person. In step S504, the system determines whether the face of the person matches the facial image of the person in the database. When the system determines that the face of the person matches the facial image of the person in the database ("Yes" in step S504), in step S506, the system opens the personnel access door so that the person can enter the parking lot. When the system determines that the face of the person does not match the facial image of the person in the database ("No" in step S504), in step S508, the system does not open the personnel access door to prevent the person from entering the parking lot.

Next, in step S510, the system detects whether the person has passed through the personnel access door. When the system detects that the person has passed through the personnel access door ("Yes" in step S510), in step S512, the system closes the personnel access door. When the system detects that the person has not passed through the personnel access door ("No" in step S510), the process returns to step S510 and the system continues detecting whether the person has passed the personnel access door.

Next, in step S514, the system may transmit a second indication signal to indicate parking spaces corresponding to the person. In an embodiment, the system may send a second indication signal to the terminal device of the driver to indicate the route and the location of the parking space. In another embodiment, the system may also send the second indication signal to the parking lot light to control the parking lot light to emit light in different colors so that the driver can find the parking space according to the parking lot light.

In step S516, the system detects whether the person enters within a first distance from the parking space. In other words, the system can detect whether the person has approached the parking space using the video camera. When the system detects that the person enters within the first distance from the parking space ("Yes" in step S516), in step S518, the system raises the parking-space barrier corresponding to the parking space so that the person can enter the parking space. When the system detects that the person is not within the first distance from the parking space ("No" in step S516), the process returns to step S516 and the system continues detecting whether the person enters within the first distance from the parking space.

In step S520, the system detects whether the person has entered the vehicle. When the system detects that the person has entered the vehicle ("Yes" in step S520), in step S522, the system lowers the parking-space barrier to prevent other people from entering the parking space. When the system detects that the person has not entered the vehicle ("No" in step S520), the process returns to step S520 and the system continues detecting whether the person has entered the vehicle.

In step S524, the system detects whether there is any other person showing up suddenly. When the system detects that other person shows up in the parking space ("Yes" in step S524), in step S526, the system locks the parking-space barrier and the wheel blocking structure, and the management server sends a notification message to notify the administrator to deal with the situation. In an embodiment, the locked parking-space barrier and locked wheel blocking structure can only be manually unlocked by the administrator to increase safety. When the system does not detect that person shows up in the parking space ("No" in step S520), in step S528, the system raises the parking-space barrier and restores the wheel blocking structure so that the vehicle can leave the parking space.

In step S530, the system detects whether the vehicle has left the parking space. When the system detects that the vehicle has left the parking space ("Yes" in step S530), in step S532, the system lowers the parking-space barrier to prevent other people from entering the parking space. When the system detects that the vehicle has not left the parking space ("No" in step S530), the process returns to step S530 and the system continues detecting whether the vehicle has left the parking space.

Next, in step S534, the system may transmit a third indication signal to indicate the exit of the parking lot. In an embodiment, the system may transmit the third indication signal to the terminal device of the driver to indicate the route and the location of the exit of the parking lot. In another embodiment, the system may also transmit the third indication signal to the parking lot light to control the parking lot light to emit light in different colors so that the driver can find the exit of the parking lot according to the parking lot light.

In step S536, the system detects whether the vehicle enters within a third distance from a first exit barrier. In other words, using the video camera, the system can detect whether the vehicle is approaching the vehicle. When the system detects that the vehicle enters within the third distance from the first exit barrier ("Yes" in step S536), in step S538, the system raises the first exit barrier. When the system detects that the vehicle does not enter within the third distance from the first exit barrier ("No" in step S536), the process returns to step S536 and the system continues detecting whether the vehicle enters within the third distance from the first exit barrier.

Then, in step S540, the system detects whether the vehicle has passed through the first exit barrier. When the system detects that the vehicle has passed through the first exit barrier ("Yes" in step S540), in step S542, the system lowers the first exit barrier. When the system detects that the vehicle has not passed through the first exit barrier ("No" in step S540), the process returns to step S540 and the system continues detecting whether the vehicle has passed through the first exit barrier.

Next, in step S544, the system detects whether there is only the one vehicle between the first exit barrier and the second exit barrier. When the system detects only the one vehicle between the first exit barrier and the second exit barrier ("Yes" in step S544), in step S546, the system raises the second exit barrier. When the system detects that there is another vehicle other than the vehicle between the first exit barrier and the second exit barrier ("No" in step S544), in step S548, the system locks the first exit barrier and the second exit barrier, and the management server sends a notification message to notify the administrator to deal with the situation. In an embodiment, the locked exit barrier and locked second exit barrier can only be manually unlocked by the administrator to increase safety.

In step S550, the system detects whether the vehicle has passed through the second exit barrier. When the system detects that the vehicle has passed through the second exit barrier ("Yes" in step S550), in step S552, the system lowers the second exit barrier. When the system detects that the vehicle has not passed through the second exit barrier ("No" in step S550), the process returns to step S550 and the system continues detecting whether the vehicle has passed through the second exit barrier.

Figure 6:
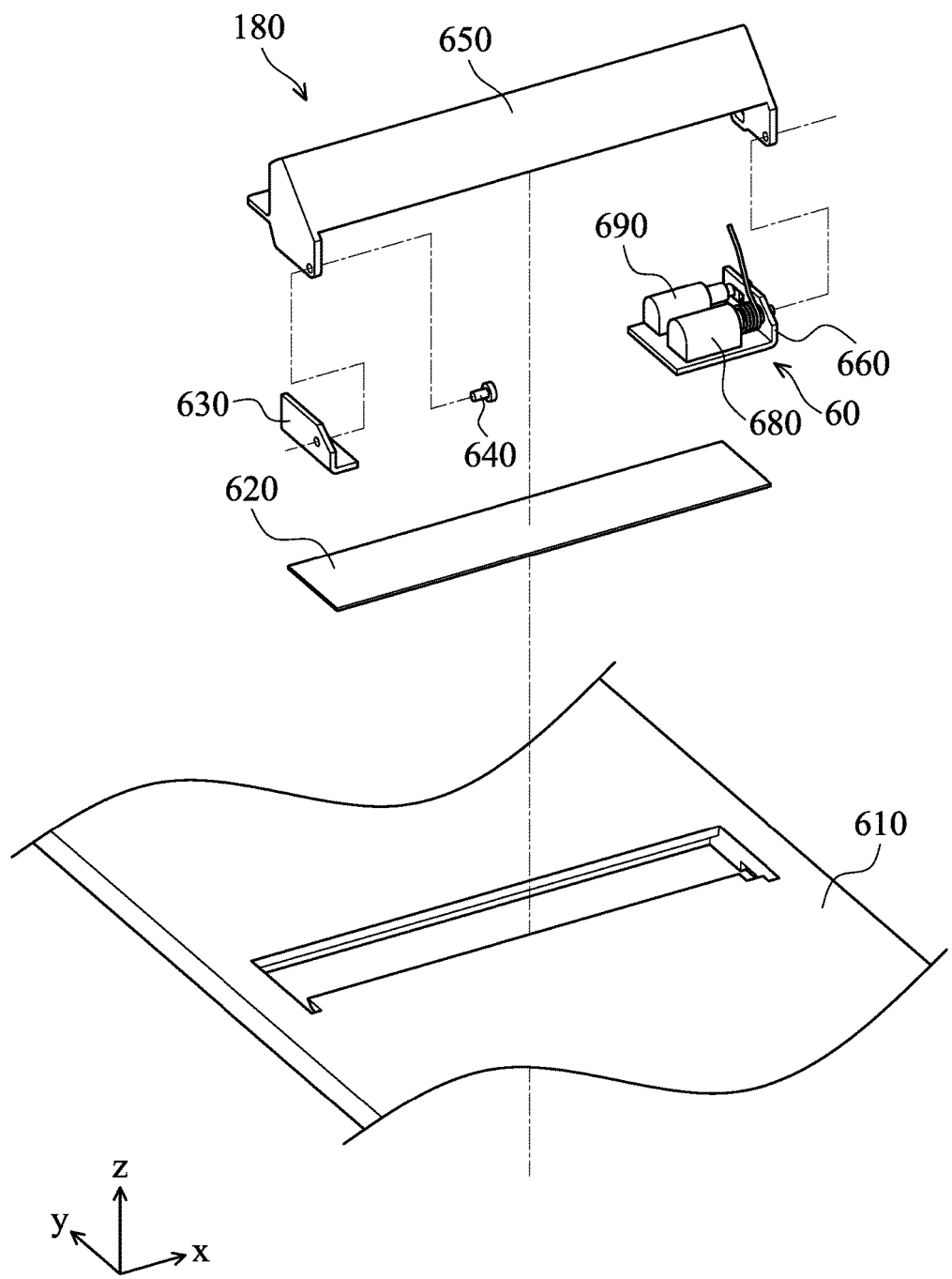
FIG. 6 is an exploded view of the wheel blocking structure according to an embodiment of the present disclosure.
Figure 7:
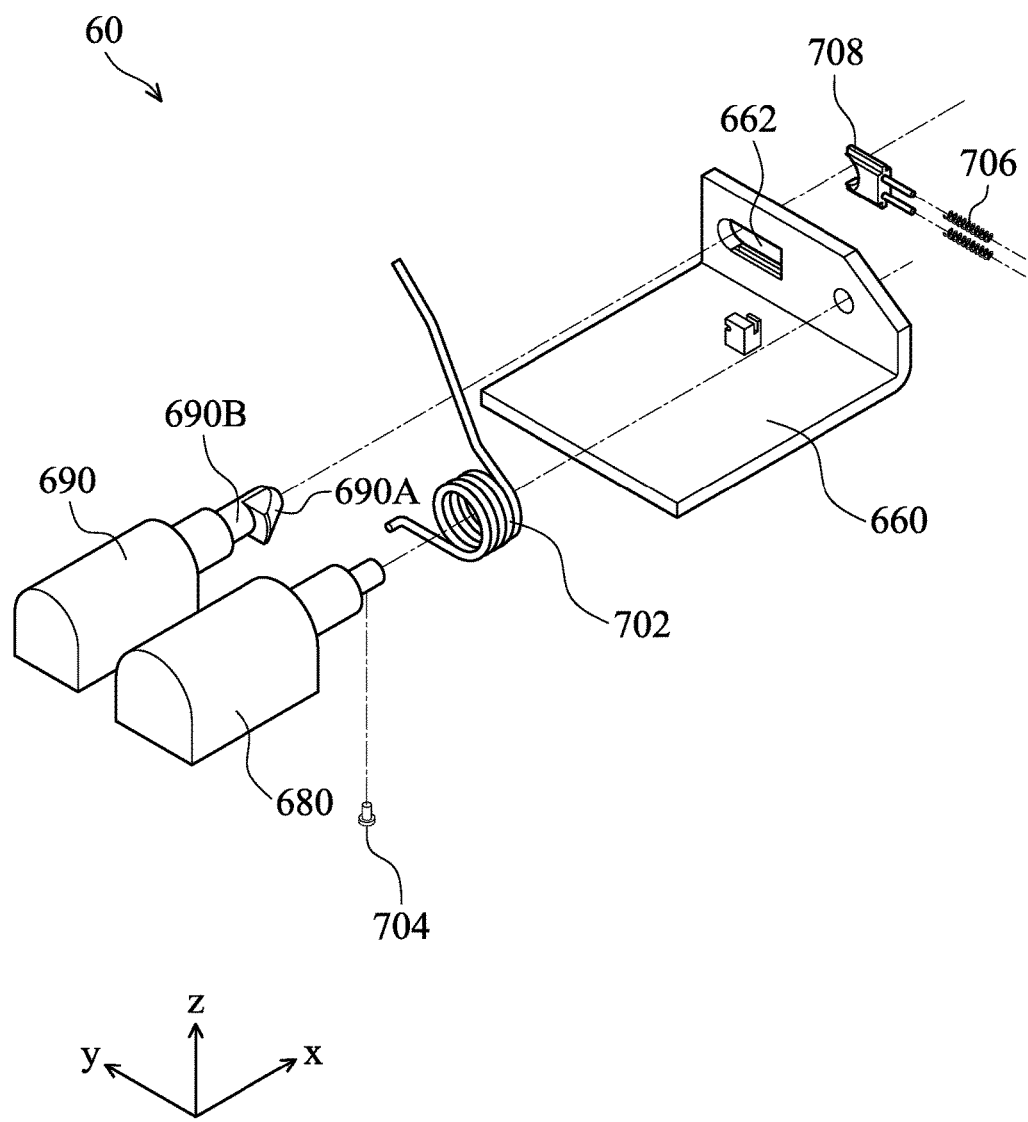
FIG. 7 is an exploded view of the locking assembly according to an embodiment of the present disclosure.

FIGS. 6~7 are exploded views of the wheel blocking structure 180 according to an embodiment of the present disclosure. The wheel blocking structure 180 mainly includes a floor 610, a bottom plate 620, a left bracket 630, a shaft 640, a rotation blocking component 650, and a locking assembly 60. The exploded view of the locking assembly 60 is shown in FIG. 7. The locking assembly 60 mainly includes a right bracket 660, a motor 680, an electromagnetic lock 690, a torsion spring 702, a screw 704, a compression spring 706 and a movable component 708.

The floor 610 is used to accommodate other components to support the weight of the vehicle. The bottom plate 620 fixes the left bracket 630 and the right bracket 660. The left bracket 630 is pivoted to the rotation blocking component 650 through the shaft 640, and the right bracket 660 is pivoted to the rotation blocking component 650 through the motor 680. It should be noted that the wheel blocking structure 180 may have a sensing device (not shown), which may be connected to the management server 120 in FIG. 1 and may be controlled by the management server 120.

The torsion spring 702 is mounted on the axis center of the motor 680 and is restrained by the right bracket 660 to rotate the rotation blocking component 650 upward. The motor 680 is fixed on the right bracket 660 to rotate the rotation blocking member 650. The screw 704 fixes the rotation blocking component 650 on the axis center of the motor 680 so that the motor 680 can drive the rotation blocking component 650 to rotate. The electromagnetic lock 690 is fixed on the right bracket 660, and has a barbed portion 690A and a connecting portion 690B. The barbed portion 690A can push the movable component 708 away through the compression spring 706. It should be noted that the right bracket 660 has an opening portion 662. When the connecting portion 690B of the electromagnetic lock 690 is combined with the movable component 708, the barbed portion 690A of the electromagnetic lock 690 can be exposed from the bracket 660 through beyond the opening portion 662.

Figure 8A:
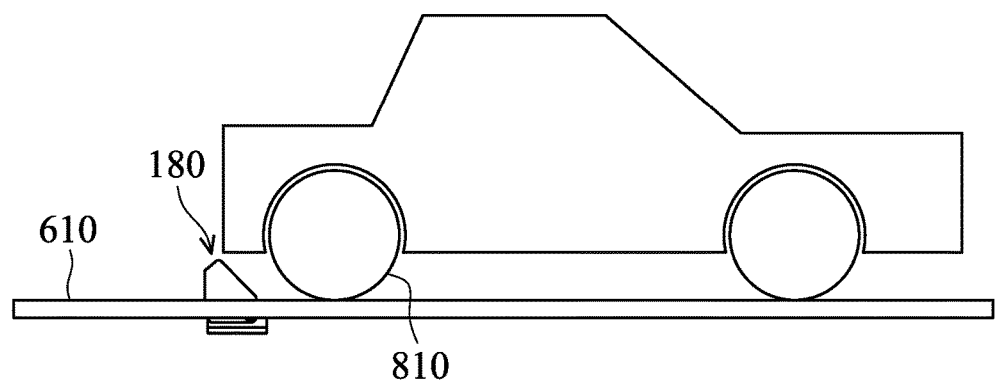
FIGS. 8A~8D are schematic diagrams illustrating how the wheel and the wheel blocking structure work together according to an embodiment of the present disclosure.
Figure 8B:
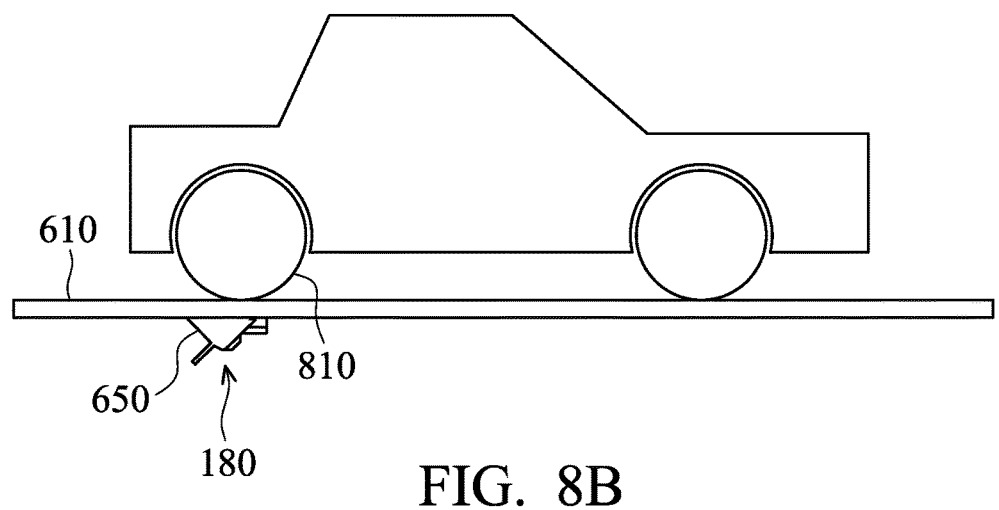
Figure 8C:
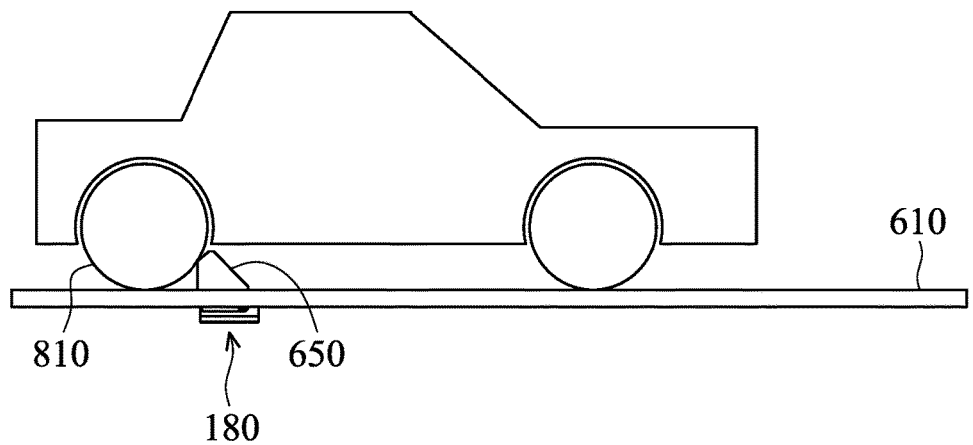
Figure 8D:
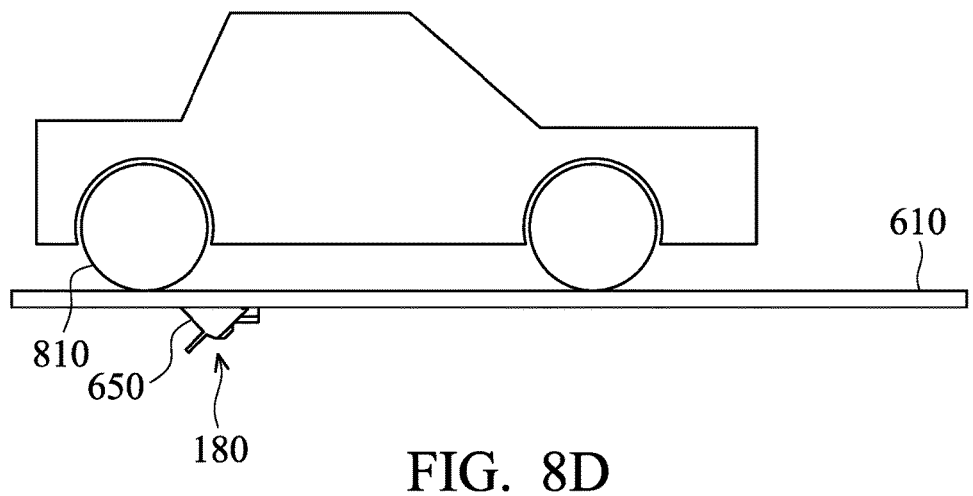

FIGS. 8A~8D are schematic diagrams illustrating how the wheel and the wheel blocking structure 180 work together according to an embodiment of the present disclosure with reference to FIGS. 6~7. As shown in FIG. 8A, the wheel 810 has not touched the wheel blocking structure 180, so the wheel blocking structure 180 has not moved. In FIG. 8B, the wheel 810 presses on the rotation blocking component 650. Since the weight of the vehicle 810 is greater than the support force of the wheel blocking structure 180, the wheel 810 forces the rotation blocking component 650 to rotate downward. At this time, the vehicle can continue moving back. In FIG. 8C, the wheel 810 has passed the rotation blocking component 650. The rotation blocking component 650 can be rotated upward from the floor 610 to the initial position by the torsion spring to prevent the wheel from forcibly passing through the rotation blocking component 650. In FIG. 8C, the management server may control the motor to rotate the rotation blocking component 650 downward by the sensing device so that the vehicle can leave the parking space.

FIGS. 9A~9E are schematic diagrams illustrating how the wheel blocking structure 180 is locked according to an embodiment of the present disclosure with reference to FIGS. 6~7. It should be noted that once the wheel blocking structure is locked, for safety, the wheel blocking structure can only be unlocked manually and cannot be unlocked remotely by the management server.

Figure 9A:
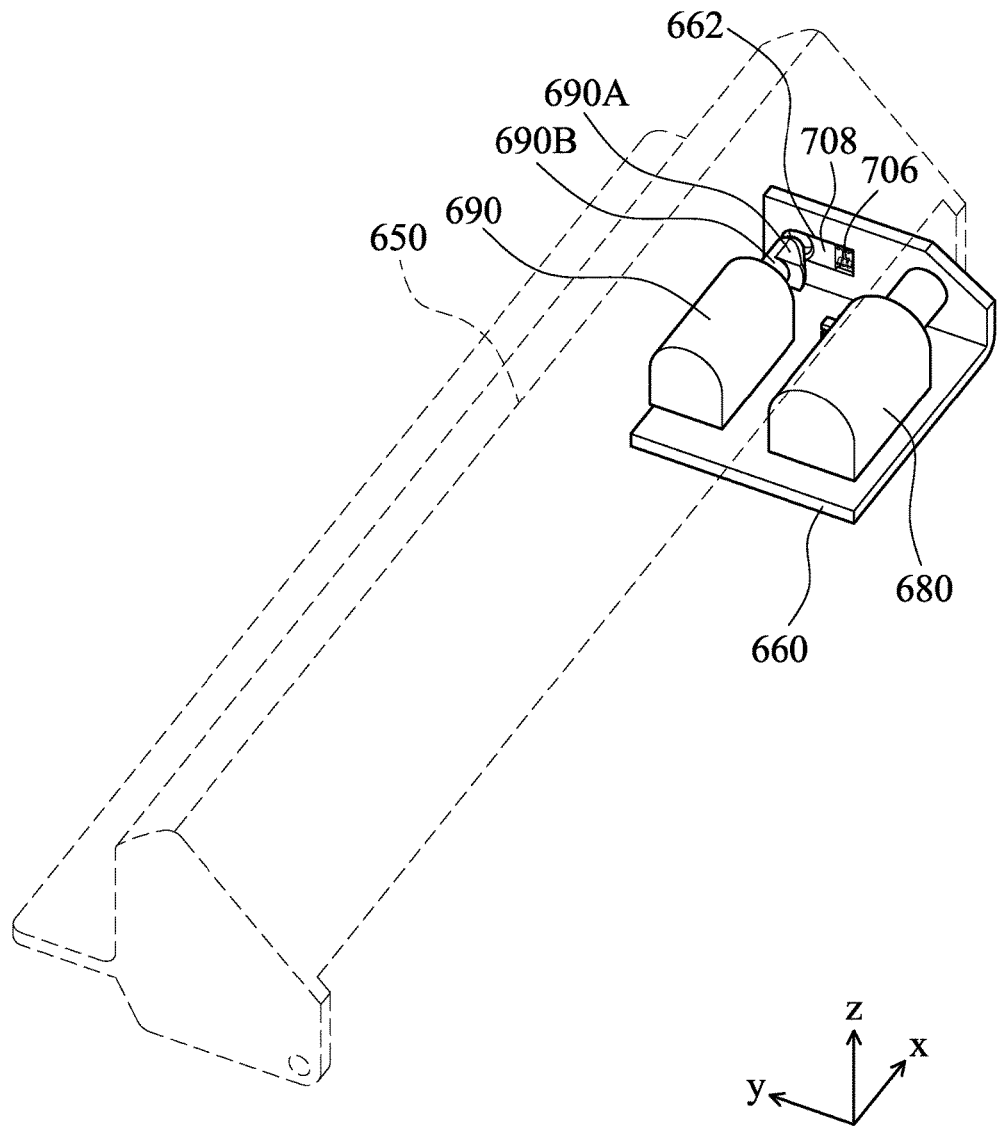
FIGS. 9A~9E are schematic diagrams illustrating how the wheel blocking structure is locked according to an embodiment of the present disclosure.
Figure 9B:
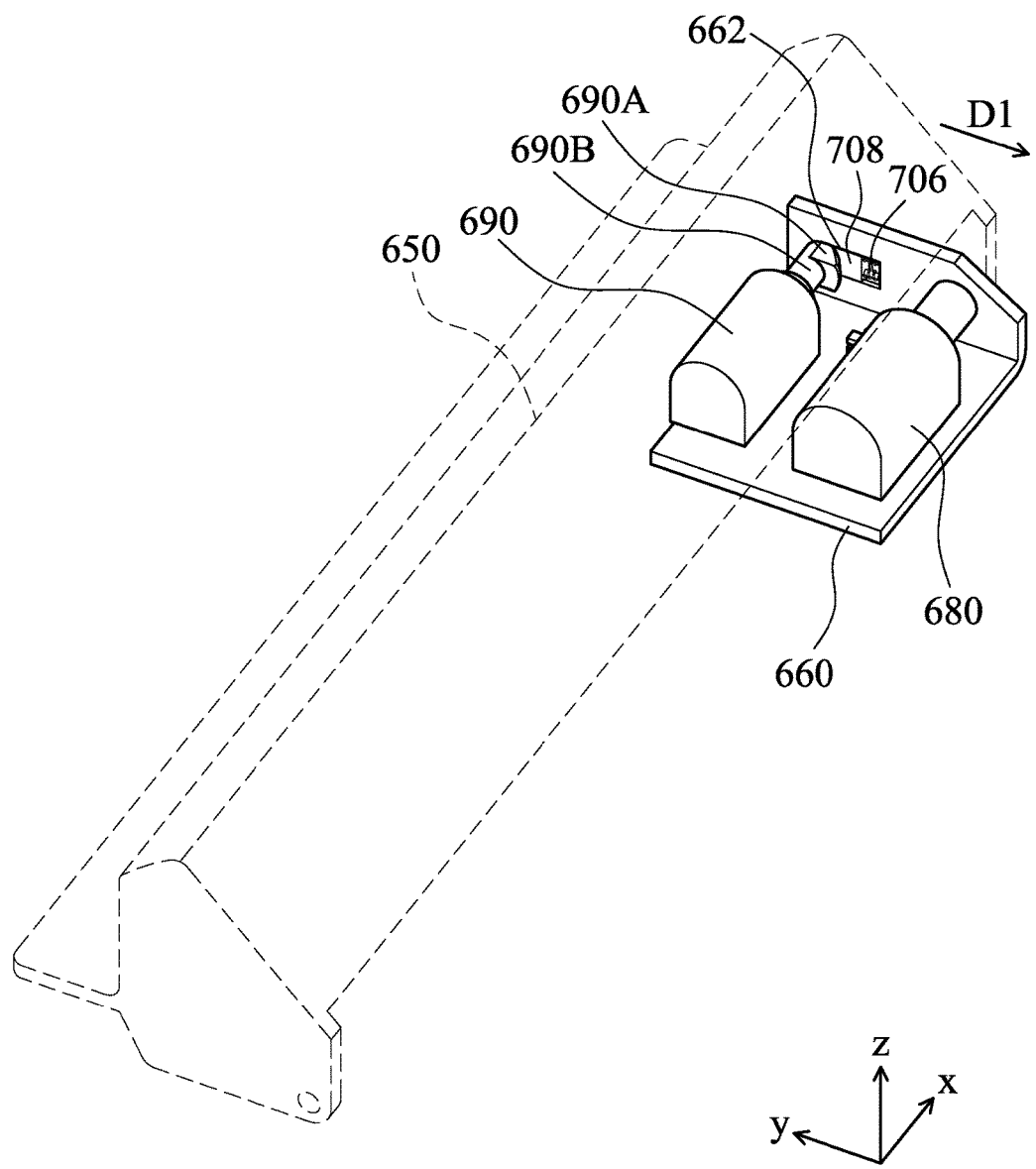
Figure 9C:
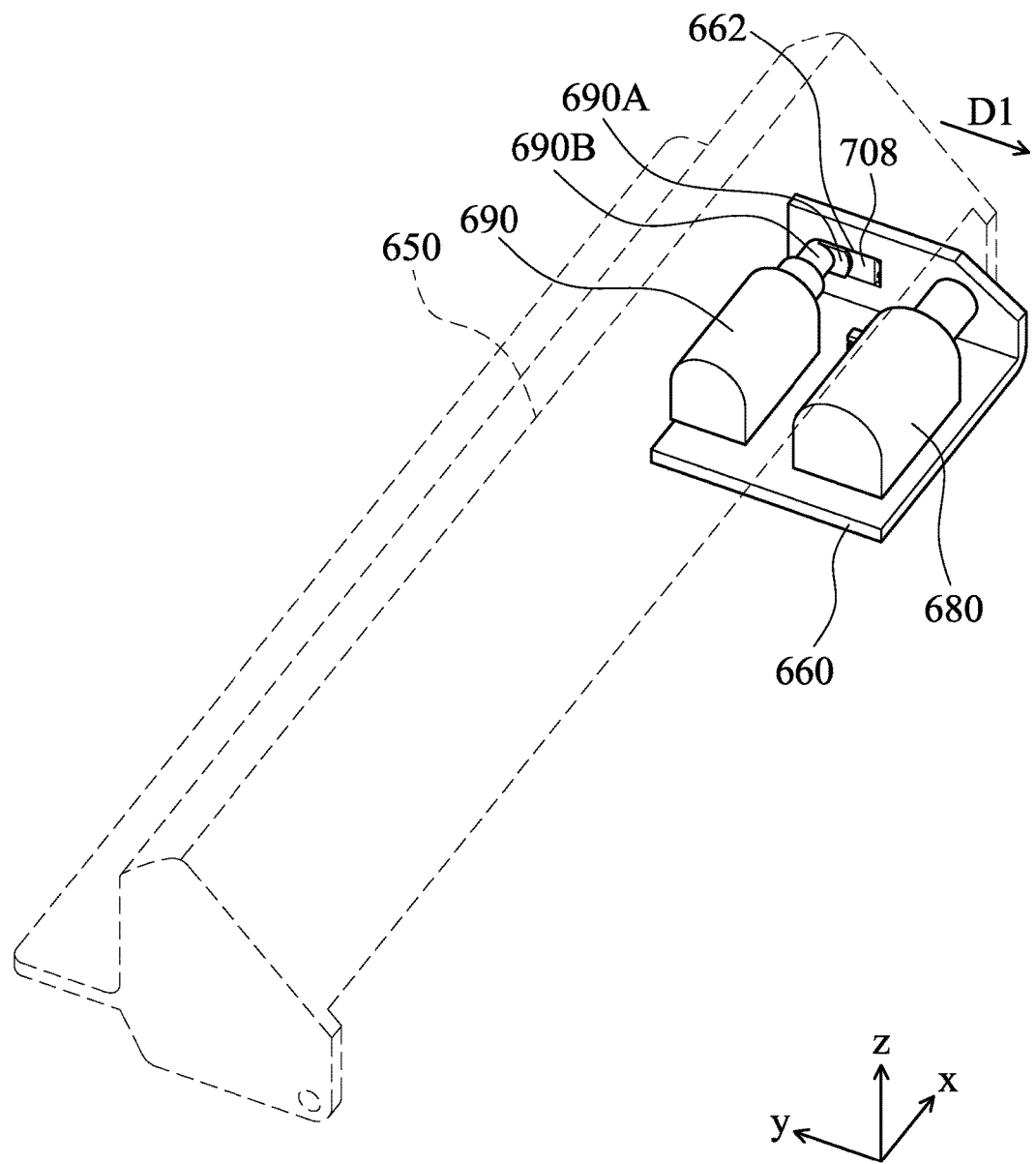
Figure 9D:
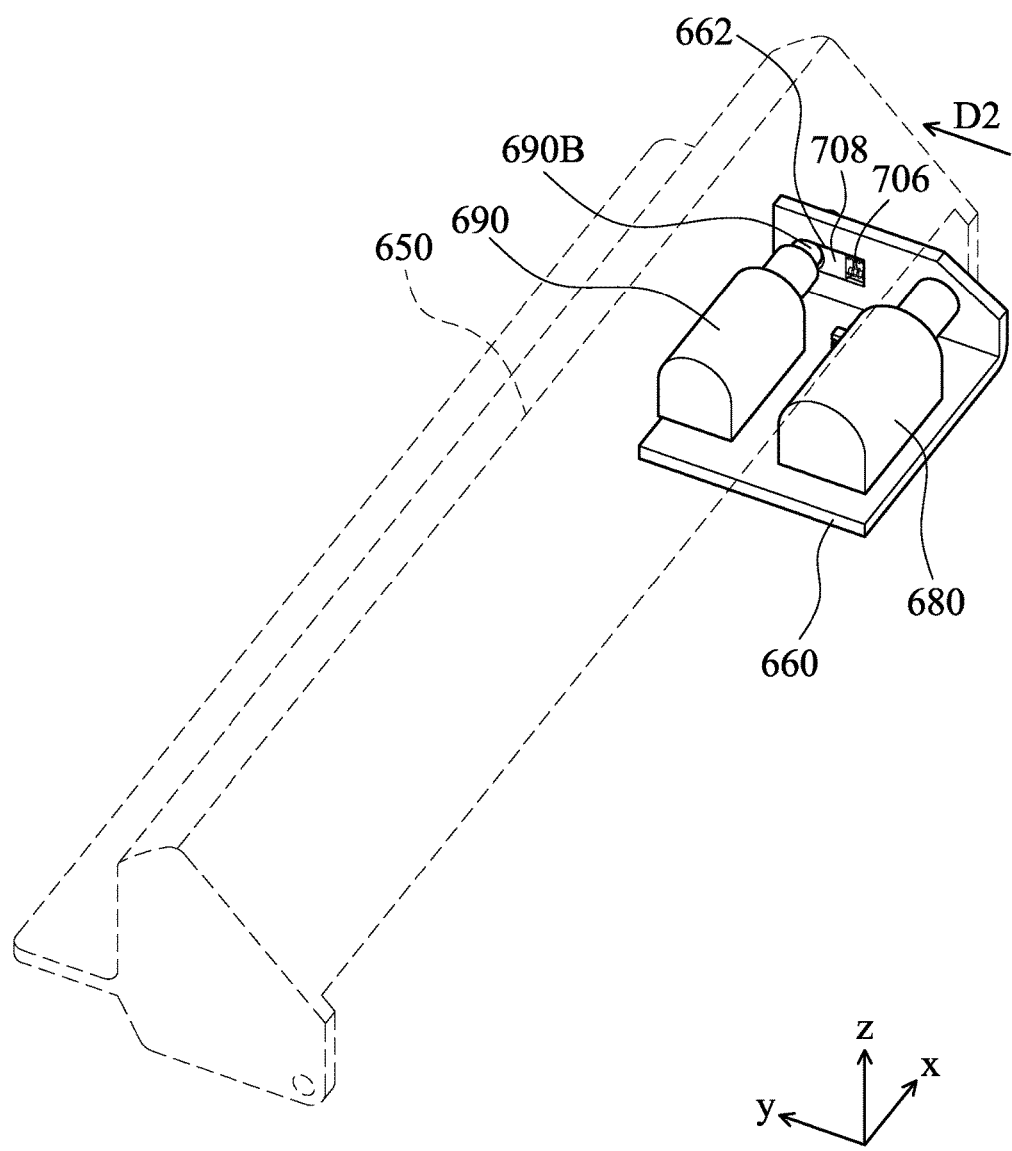
Figure 9E:
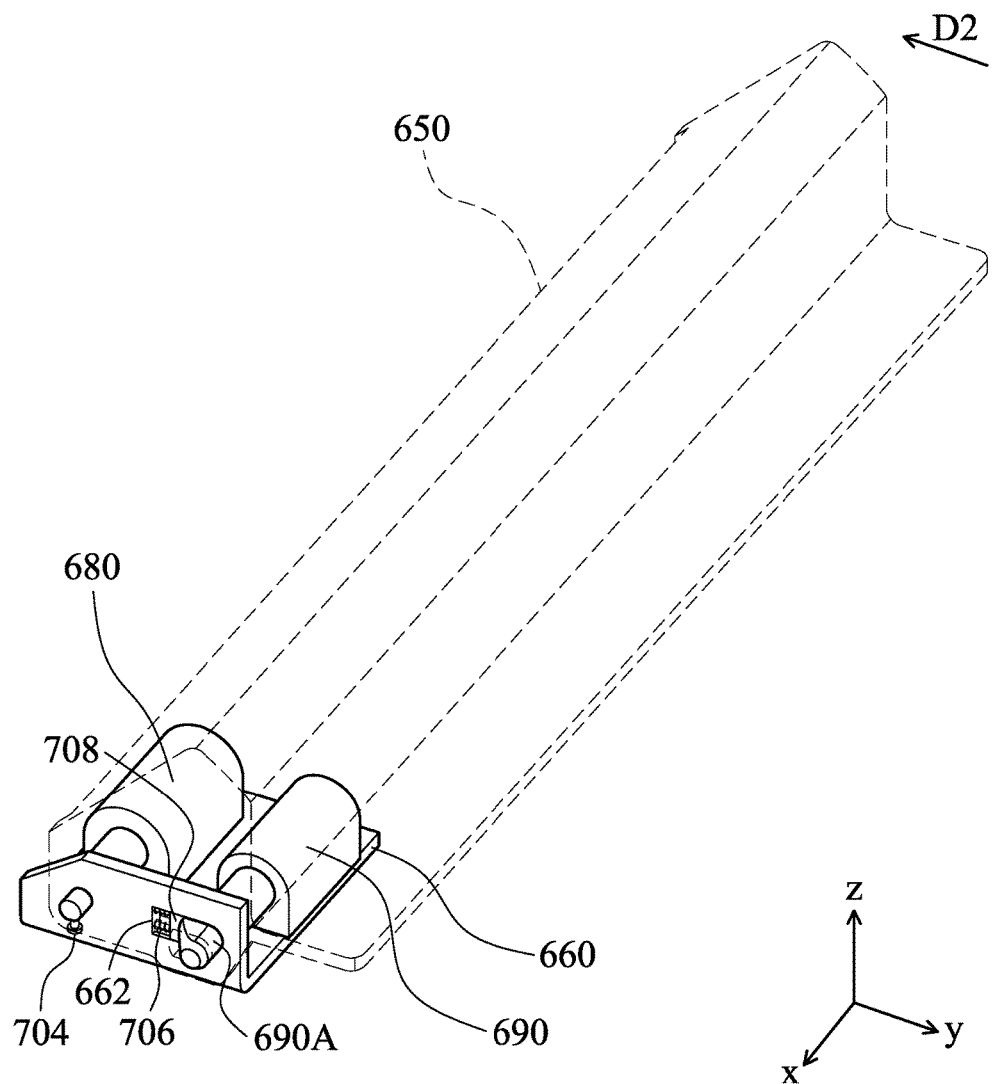

In FIG. 9A, the wheel blocking structure has not been moved, so that the barbed portion 690A of the electromagnetic lock 690 is in the initial position. In FIGS. 9B to 9C, the barbed portion 690A of the electromagnetic lock 690 moves along a direction D1 (a negative Y-axis direction) and forces the movable component 708 to move toward the motor 680 along the direction D1. In FIGS. 9D to 9E, the movable component 708 contacts the connecting portion 690B of the electromagnetic lock 690, and the movable component 708 moves toward the electromagnetic lock 690 in a direction D2 (a Y-axis direction) by the compression spring 706 and returns to the initial position to ensure that the electromagnetic lock 690 cannot return to its initial position.

In addition, in the above exemplary system, although the method has been described on the basis of the flow diagram using a series of the steps or blocks, the present disclosure is not limited to the sequence of the steps, and some of the steps may be performed in order different from that of the remaining steps or may be performed simultaneously with the remaining steps. Furthermore, those skilled in the art will understand that the steps shown in the flow diagram are not exclusive and they may include other steps or one or more steps of the flow diagram may be deleted without affecting the scope of the present disclosure. For example, steps S424, S426 and S428 of FIG. 4 can be omitted.

In addition, the central processing unit 208 can execute the program code 212 in the memory to perform all of the above-described actions and steps or others described herein.

Therefore, the method and the system for managing the parking lot provided in the present disclosure can ensure the safety of people and vehicles from entering the parking lot to leaving the parking lot. In addition, since the barriers and wheel blocking device provided in the present disclosure can only be manually unlocked after being locked, the safety of the people and vehicles can further be increased.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the disclosure has been described by way of example and in terms of exemplary embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method for managing a parking lot, comprising:
capturing, by a first video camera, an entrance image of a vehicle;
determining whether the entrance image satisfies a first condition based on information stored in a database;
raising a first barrier in response to the entrance image satisfying the first condition;
detecting whether there is only the one vehicle between the first barrier and a second barrier; and
raising the second barrier to enable the vehicle to enter the parking lot in response to detecting that there is only the one vehicle between the first barrier and the second barrier;
wherein the step of determining whether the entrance image satisfies the first condition further comprises:
determining whether vehicle information of the vehicle in the entrance image matches the information stored in the database; and
raising the first barrier in response to the vehicle information matching the information stored in the database;
wherein the method further comprises:
detecting whether the vehicle enters within a first distance from a parking space;

raising a parking-space barrier corresponding to the parking space in response to detecting that the vehicle enters within the first distance from the parking space;

detecting whether a wheel blocking structure corresponding to the parking space is triggered to limit the vehicle in the parking space;

detecting whether a person has left the parking space in response to the wheel blocking structure corresponding to the parking space being triggered; and lowering the parking-space barrier in response to detecting that the person has left the parking space.

2. The method for managing a parking lot as claimed in claim 1, wherein the parking-space barrier is mounted in a position in front of a driver's seat corresponding to the vehicle.

3. The method for managing a parking lot as claimed in claim 1, wherein before detecting whether the vehicle enters within the first distance from the parking space, the method further comprises:

determining whether there is a fixed parking space in the database corresponding to a license number of the vehicle;

transmitting a first indication signal to indicate the fixed parking space in response to the fixed parking space corresponding to the license number being stored in the database; and selecting a first parking space as the parking space and transmitting the first indication signal to indicate the parking space in response to there being no fixed parking space corresponding to the license number in the database, wherein the first parking space is selected from among the parking spaces in which the vehicle has previously parked in a history record corresponding to the vehicle in the database.

4. The method for managing a parking lot as claimed in claim 1, wherein after lowering the parking-space barrier, the method further comprises:

detecting whether the person enters within a second distance from a personnel access door;

opening the personnel access door in response to detecting that the person enters within the second distance from the personnel access door; and closing the personnel access door in response to detecting that the person has left the parking lot.

5. The method for managing a parking lot as claimed in claim 4, further comprising the steps of:

capturing, by the first video camera, an exit image of a vehicle;

determining whether the exit image satisfies a second condition based on information stored in the database;

raising the second barrier in response to the exit image satisfying the second condition;

detecting whether there is only the one vehicle between the second barrier and the first barrier; and raising the first barrier to enable the vehicle to leave the parking lot in response to detecting that there is only the one vehicle between the second barrier and the first barrier;

wherein the method further comprises:

detecting whether the vehicle enters within a third distance from the second barrier; and raising the second barrier in response to detecting that the vehicle enters within the third distance from the second barrier.

6. The method for managing a parking lot as claimed in claim 5, wherein before capturing the entrance image of the vehicle, the method further comprises:

capturing, by a second camera, a second entrance image from the personnel access door, wherein the second image comprises the person;

determining whether a face of the person matches a facial image of the person in the database;

opening the personnel access door in response to the face of the person matching the facial image of the person in the database;

transmitting a second indication signal to indicate the parking space corresponding to the person;

detecting whether the person enters within the first distance from the parking space;

raising the parking-space barrier corresponding to the parking space in response to detecting that the person enters within the first distance from the parking space;

detecting whether the person has entered the vehicle; and restoring a wheel blocking structure in response to detecting that the person has entered the vehicle.

7. The method for managing a parking lot as claimed in claim 6, wherein after detecting that the person has entered the vehicle, the method further comprises:

lowering the parking-space barrier and detecting whether there is any other person in the parking space; and locking the wheel blocking structure and transmitting a notification signal to an administrator in response to detecting that there is other person in the parking space.

8. The method for managing a parking lot as claimed in claim 6, wherein after opening the personnel access door, the method further comprises:

detecting whether the person passes through the personnel access door; and closing the personnel access door in response to detecting that the person has passed through the personnel access door.

9. The method for managing a parking lot as claimed in claim 6, wherein after restoring the wheel blocking structure, the method further comprises:

detecting whether the vehicle has left the parking space; and lowering the parking-space barrier and transmitting a third indication signal to indicate the first barrier in response to detecting that the vehicle has left the parking space.

10. The method for managing a parking lot as claimed in claim 1, wherein after raising the first barrier, the method further comprises:

detecting whether the vehicle has passed through the first barrier; and lowering the first barrier in response to detecting that the vehicle has passed through the first barrier.

11. The method for managing a parking lot as claimed in claim 1, wherein after raising the second barrier, the method further comprises:

detecting whether the vehicle has passed through the second barrier; and lowering the second barrier in response to detecting that the vehicle has passed through the second barrier.

12. The method for managing a parking lot as claimed in claim 1, wherein a distance between the first barrier and the second barrier is within a range.

13. A system for managing a parking lot, at least comprising:

a parking lot, provided with a first barrier and a second barrier;

a management server, coupled to the first barrier and the second barrier, comprising:
a control circuit;
a processor installed in the control circuit; and
a memory installed in the control circuit and operatively coupled to the processor;
wherein the processor is configured to execute a program code stored in the memory to perform operations comprising:
capturing an image of a vehicle with a first video camera;
determining whether the image satisfies a condition based on information stored in a database;
raising a first barrier in response to the image satisfying the condition;
detecting whether there is only the one vehicle between the first barrier and a second barrier; and
raising the second barrier to enable the vehicle to enter or leave the parking lot in response to detecting that there is only the one vehicle between the first barrier and the second barrier;
wherein in response to the image being an entrance image of the vehicle entering the parking lot, the processor determining whether the image satisfies the condition further comprises:
determining whether vehicle information of the vehicle in the entrance image matches the information stored in the database; and
raising the first barrier in response to the vehicle information matching the information stored in the database;
wherein the processor further executes the program code to:
detect whether the vehicle enters within a first distance from a parking space;
raise a parking-space barrier corresponding to the parking space in response to detecting that the vehicle enters within the first distance from the parking space;
detect whether a wheel blocking structure corresponding to the parking space is triggered to limit the vehicle in the parking space;
detect whether a person has left the parking space in response to the wheel blocking structure corresponding to the parking space being triggered; and
lower the parking-space barrier in response to detecting that the person has left the parking space.

14. The system for managing a parking lot as claimed in claim 13, wherein the parking-space barrier is mounted in a position in front of a driver's seat corresponding to the vehicle.

15. The system for managing a parking lot as claimed in claim 13, wherein before the processor detects whether the vehicle enters within the first distance from the parking space, the processor further executes the program code to:
determine whether there is a fixed parking space in the database corresponding to the license number of the vehicle;
transmit a first indication signal to indicate the fixed parking space in response to the fixed parking space corresponding to the license number being stored in the database; and
select a first parking space as the parking space and transmit the first indication signal to indicate the parking space in response to there being no fixed parking space corresponding to the license number in the database, wherein the first parking space is selected from among the parking spaces in which the vehicle has previously parked in a history record corresponding to the vehicle in the database.

16. The system for managing a parking lot as claimed in claim 13, wherein after lowering the parking-space barrier, the processor further executes the program code to:
detect whether the person enters within a second distance from a personnel access door;
open the personnel access door in response to detecting that the person enters within the second distance from the personnel access door; and
close the personnel access door in response to detecting that the person has left the parking lot.

17. The system for managing a parking lot as claimed in claim 16, wherein in response to the image being an exit image of the vehicle approaching the first barrier, the processor-further executes the program code to:
detect whether the vehicle enters within a third distance from the first barrier; and
raise the first barrier in response to detecting that the vehicle enters within the third distance from the first barrier.

18. The system for managing a parking lot as claimed in claim 17, wherein before capturing the image of the vehicle, the processor further executes the program code to:
capture a second entrance image from the personnel access door using a second camera, wherein the second image comprises the person;
determine whether a face of the person matches a facial image of the person in the database;
open the personnel access door in response to the face of the person matching the facial image of the person in the database;
transmit a second indication signal to indicate the parking space corresponding to the person;
detect whether the person enters within the first distance from the parking space;
raise the parking-space barrier corresponding to the parking space in response to detecting that the person enters within the first distance from the parking space;
detect whether the person has entered the vehicle; and
restore a wheel blocking structure in response to detecting that the person has entered the vehicle.

19. The system for managing a parking lot as claimed in claim 18, wherein after detecting that the person has entered the vehicle, the processor further executes the program code to execute:
lower the parking-space barrier and detect whether there is any other person in the parking space; and
lock the wheel blocking structure and transmit a notification signal to an administrator in response to detecting that there is other person in the parking space.

20. The system for managing a parking lot as claimed in claim 18, wherein after opening the personnel access door, the processor further executes the program code to:
detect whether the person passes through the personnel access door; and
close the personnel access door in response to detecting that the person has passed through the personnel access door.

21. The system for managing a parking lot as claimed in claim 18, wherein after restoring the wheel blocking structure, the processor further executes the program code to:
detect whether the vehicle has left the parking space; and
lower the parking-space barrier and transmitting a third indication signal to indicate the first barrier in response to detecting that the vehicle has left the parking space.

22. The system for managing a parking lot as claimed in claim 13, wherein after raising the first barrier, the processor further executes the program code to:
- detect whether the vehicle has passed through the first barrier; and
- lower the first barrier in response to detecting that the vehicle has passed through the first barrier.

23. The system for managing a parking lot as claimed in claim 13, wherein after raising the second barrier, the processor further executes the program code to:
- detect whether the vehicle has passed through the second barrier; and
- lower the second barrier in response to detecting that the vehicle has passed through the second barrier.

24. The system for managing a parking lot as claimed in claim 13, wherein a distance between the first barrier and the second barrier is within a range.

* * * * *